Figure 1:
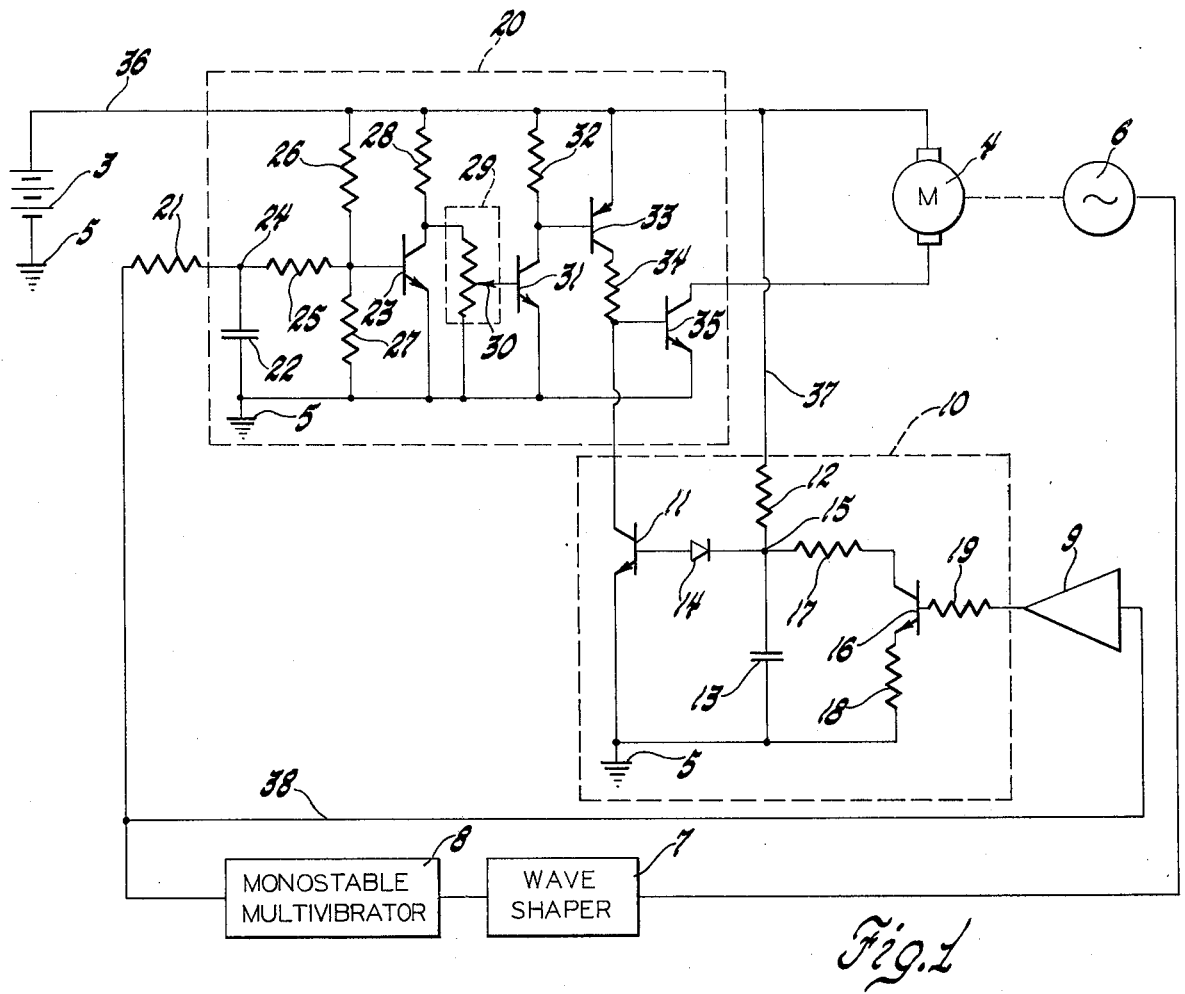

United States Patent
Osburn

[11] 3,931,557
[45] Jan. 6, 1976

[54] DC MOTOR STALL PROTECTION CIRCUIT

[75] Inventor: David W. Osburn, Kokomo, Ind.

[73] Assignee: General Motors Corporation, Detroit, Mich.

[22] Filed: Nov. 13, 1974

[21] Appl. No.: 523,211

[52] U.S. Cl. ................ 318/434; 318/474; 318/476; 317/13 R
[51] Int. Cl.² ........................................... H02P 7/74
[58] Field of Search ....... 318/434, 474, 476; 317/13

[56] References Cited
UNITED STATES PATENTS

| | | | |
|---|---|---|---|
| 3,383,561 | 5/1968 | Thiele | 317/13 |
| 3,427,506 | 2/1969 | Thiele | 317/13 |
| 3,551,775 | 9/1968 | Safiuddin | 318/476 X |
| 3,569,810 | 3/1971 | Thiele | 318/434 X |
| 3,576,485 | 4/1971 | Coons, Jr. | 318/327 X |

Primary Examiner—B. Dobeck
Attorney, Agent, or Firm—Richard G. Stahr

[57] ABSTRACT

A series of electrical signals of a frequency directly proportional to the speed of a motor controlled by a speed control circuit of the type which completes an energizing circuit for the motor through the current carrying electrodes of a switching transistor is generated. These signals are employed to produce a direct current reference potential signal which increases rapidly in magnitude when the motor becomes stalled. The reference potential signal is applied across the series combination of a Zener diode and the base-emitter electrodes of an NPN transistor for supplying base-emitter drive current to the transistor when the potential level thereof reaches a magnitude equal to the inverse breakdown potential of the Zener diode. The collector-emitter electrodes of the NPN transistor are connected in circuit with the motor speed control circuit in such a manner that the control circuit switching transistor is maintained not conductive while base-emitter drive current is supplied to the NPN transistor.

7 Claims, 2 Drawing Figures

DC MOTOR STALL PROTECTION CIRCUIT

This invention is directed to a motor stall protection circuit and, more specifically, to a circuit of this type which maintains the switching transistor of an associated motor speed control circuit not conductive during motor stall conditions.

There are many applications which require the speed of an electrical motor to be adjustable or to be regulated within narrow limits. Prior art motor speed control or regulating circuits provided motor and output device protection under stalled motor conditions by limiting motor current or, in the case of integrated circuit controllers, by "thermal shutdown". If the motor current is limited to some safe maximum value, then the maximum torque of the motor is materially reduced. This increases the starting time and results in a sluggish system response to torque variation. With integrated circuit speed controllers, motor stall condition protection is generally provided by "thermal shutdown" circuits. These circuits remove the drive to the output device if the integrated circuit chip temperature exceeds a predetermined maximum limit. With this method of motor stall conditions protection, there must be a compromise on the thermal resistance of the controller. If the thermal resistance is low enough to provide a wide margin of safety for package dissipation, then the "thermal shutdown" circuit may never operate or operate slowly at low ambient temperatures. Therefore a motor stall protection circuit which allows the control system to supply maximum motor torque and which allows a conservative integrated circuit system package and which shuts the system down under sustained abnormal loads or motor stall conditions is desirable.

It is, therefore, an object of this invention to provide an improved motor stall protection circuit.

It is another object of this invention to provide an improved motor stall protection circuit which is responsive to a direct current reference potential signal which increases rapidly in magnitude when the controlled motor has become stalled to extinguish an associated motor speed control system output switching transistor connected in series with the controlled motor.

In accordance with this invention, an improved motor stall protection circuit is provided wherein a direct current reference potential signal which increases rapidly in magnitude when the motor becomes stalled is applied across the series combination of a Zener diode and the base-emitter electodes of an NPN output transistor to trigger this device conductive, with motor stall conditions, through the collector-emitter electrodes which are connected in circuit with an associated speed control circuit for extinguishing the speed control circuit output switching transistor.

Figure 2:
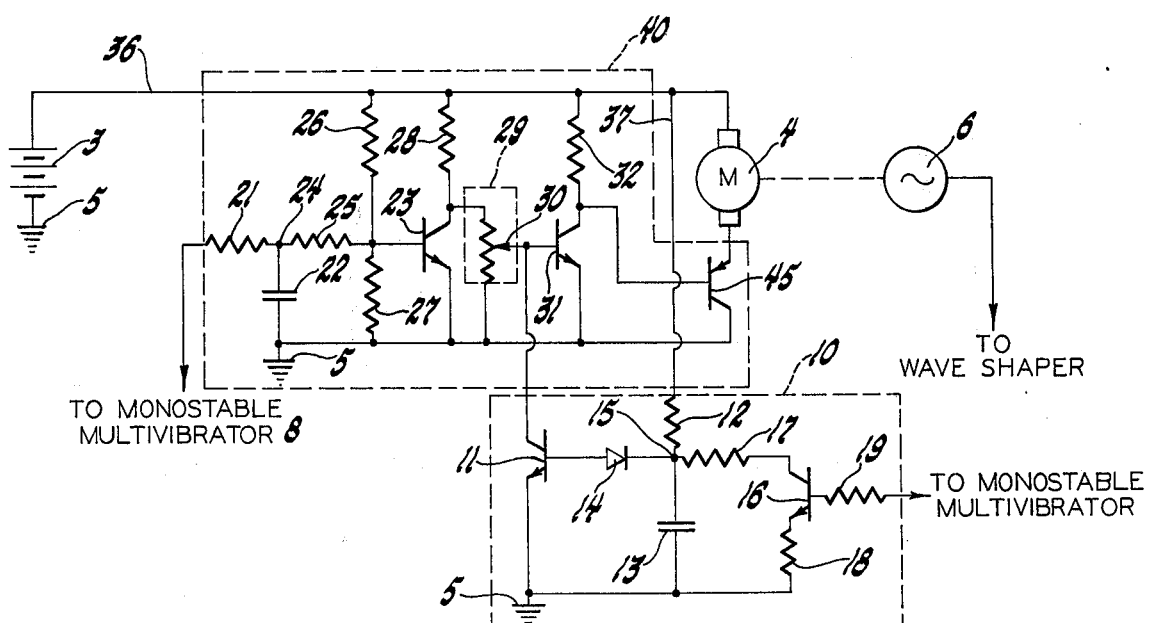

For a better understanding of the present invention, together with additional objects, advantages and features thereof, reference is made to the following description and accompanying drawing in which:

FIG. 1 sets forth, in schematic form, the motor stall protection circuit of this invention in combination with an associated motor and motor speed control circuit; and FIG. 2 sets forth, in schematic form, the motor stall protection circuit of this invention in combination with an associated controlled motor and an alternate motor speed control circuit.

In FIGS. 1 and 2 of the drawing, like elements have been assigned like characters of reference.

As the point of reference or ground potential is the same point electrically throughout the system, it has been illustrated in FIGS. 1 and 2 by the accepted schematic symbol and referenced by the numeral 5.

Referring to FIG. 1 of the drawing, the motor stall protection circuit of this invention is set forth in schematic form in combination with a supply potential source, which may be a battery 3 or any other direct current potential source, having a positive polarity supply output terminal and a negative polarity return output terminal, an electric motor 4 and a motor speed control circuit. Without intention or inference of a limitation thereto, one example of a motor speed control circuit suitable for use with the motor stall protection circuit of this invention is set forth schematically within dashed rectangle 20 of FIG. 1. It is to be specifically understood that alternate well known motor speed control circuits of the type which complete an energizing circuit for the controlled motor across the supply potential source through the current carrying electrodes of an output switching transistor may be employed without departing from the spirit of the invention.

To provide electrical signals indicative of the speed of motor 4, a tachometer generator 6 having an armature driven by the armature of motor 4 and of the type which produces a series of alternating current output signals of a frequency directly proportional to the speed of motor 4 may be employed. It is to be specifically understood that other arrangements for supplying electrical signals indicative of the speed of motor 4 may be employed without departing from the spirit of the invention. It is only necessary that the arrangement provides a series of electrical signals of a frequency directly proportional to motor speed or a signal which may be converted to a series of electrical signals of a frequency directly proportional to motor speed. If desirable, the output signals of tachometer generator 6 may be shaped to a substantially square waveform by a conventional wave shaper circuit 7 and the shaped output waves of wave shaper circuit 7 may be applied to the input of a conventional monostable multivibrator circuit 8. Monostable multivibrator circuit 8 produces a series of output signals of a substantially square waveform and a constant pulse width at a repetition rate or frequency directly proportional to the speed of motor 4. As wave shaper circuit 7 and monostable multivibrator circuit 8 may be any of the several wave shaper and monostable multivibrator circuits of common design well known in the electronics art, each has been illustrated in FIG. 1 in block form.

The series of electrical output signals of monostable multivibrator circuit 8 of a frequency directly proportional to the speed of motor 4 is converted to a direct current potential level signal of a magnitude directly proportional to the speed of motor 4 by resistor 21 and parallel connected capacitor 22. This direct current potential level signal of a positive polarity upon junction 24 with respect to point of reference or ground potential 5, is applied across the base-emitter electrodes of NPN transistor 23 through current limiting resistor 25. Transistor 23 is biased for Class A operation by series resistors 26 and 27, consequently, the degree of collector-emitter conduction through transistor 23 is directly proportional to the magnitude of the direct current potential level signal appearing across junction 24 and point of reference or ground potential 5. The potential of battery 3 is applied across the series combination of collector resistor 28 and potentiometer 29 connected in parallel with the collector-emitter electrodes of transistor 23 and the potential appearing across movable contact 30 of potentiometer 29 and point of reference or ground potential 5 is applied across the base-emitter electrodes of NPN transistor 31. While the level of this potential is of a sufficient magnitude to produce base-emitter drive current through transistor 31, this device is conductive through the collector-emitter electrodes as the collector-emitter electrodes thereof are connected across battery 3 through collector resistor 32 and positive polarity lead 36 and point of reference or ground potential 5, respectively. While transistor 31 is conductive through the collector-emitter electrodes, a circuit is completed thereby through which emitter-base drive current is supplied to PNP transistor 33, the amount of emitter-base drive current supplied to transistor 33 being determined by the degree of conduction of transistor 31. While the circuit through which emitter-base drive current is supplied to transistor 33 is completed through the collector-emitter electrodes of transistor 31, transistor 33 is conductive through the emitter-collector electrodes to supply base-emitter drive current to output switching transistor 35 through current limiting resistor 34. While output switching transistor 35 is conductive through the collector-emitter electrodes, an energizing circuit for motor 4 is completed across battery 3 through a circuit which may be traced from the positive polarity output supply terminal of battery 3, through positive polarity lead 36, motor 4, the collector-emitter electodes of output switching transistor 35 and point of reference or ground potential 5 to the negative polarity return terminal of battery 3. The speed of electric motor 4, therefore, is determined by the degree of collector-emitter conduction through transistor 35. The magnitude of the direct current potential level signal across junction 24 and point of reference or ground potential 5 increases and decreases as the speed of motor 4 increases and decreases, respectively. An increase of the direct current potential level of this signal with an increase of speed of motor 4 produces an increase of the degree of conduction through transistor 23. An increase of the degree of conduction through transistor 23 results in a decrease of potential across movable contact 30 of potentiometer 29 and point of reference or ground potential 5, consequently, the degree of conduction through transistor 31 decreases. A decrease of the degree of conduction through transistor 31 decreases the amount of emitter-base drive current supplied to and, consequently, the degree of conduction through transistor 33. A decrease of conduction through transistor 33 decreases the amount of base-emitter drive current supplied to output switching transistor 35. The decrease of base-emitter drive current supplied to output switching transistor 35 reduces the degree of collector-emitter conduction therethrough, a condition which tends to reduce the speed of motor 4. A decrease of the direct current potential level of this signal with a decrease of the speed of motor 4 produces a decrease of the degree of conduction through transistor 23. A decrease of the degree of conduction through transistor 23 results in an increase of potential across movable contact 30 of potentiometer 29 and point of reference or ground potential 5, consequently, the degree of conduction through transistor 31 increases. An increase of the degree of conduction through transistor 31 increases the amount of emitter-base drive current supplied to and, consequently, the degree of conduction through transistor 33. An increase of conduction through transistor 33 increases the amount of base-emitter drive current supplied to output switching transistor 35. The increase of base-emitter drive current supplied to output switching transistor 35 increases the degree of collector-emitter conduction therethrough, a conduction which tends to increase the speed of motor 4. The speed of motor 4 is regulated within narrow limits by the direct current potential level signal appearing across junction 24 and point of reference or ground potential 5 which establishes the degree of conduction through transistor 23. The speed of motor 4 may be selectively adjusted by adjusting movable contact 30 of potentiometer 29 which changes the degree of conduction through transistors 31, 33 and 35.

The motor stall protection circuit of this invention is schematically set forth within dashed rectangle 10 and is comprised of an NPN output transistor 11, a resistor 12 and a capacitor 13 connected in series across battery 3 through positive polarity lead 36 and lead 37, a Zener diode 14 connected in an inverse polarity relationship across the control or base electrode of transistor 11 and junction 15 between resistor 12 and capacitor 13 and a second NPN transistor 16 having the collector-emitter electrodes thereof connected across capacitor 13 through series collector resistor 17 and series emitter resistor 18, respectively.

The series of electrical output signals of monostable multivibrator 8 of a frequency directly proportional to the speed of motor 4 are applied through lead 38, an amplifier circuit 9 and current limiting resistor 19 to the control or base electrode of NPN transistor 16. As the series of output signals of monostable multivibrator circuit 8 are of a positive polarity with respect to point of reference or ground potential 5, these signals are applied to the control or base electrode of NPN transistor 16 in the proper polarity relationship to produce base-emitter drive current therethrough. Amplifier circuit 9 is not absolutely necessary and may or may not be required, depending upon the potential level magnitude of the output signals of monostable miltivibrator circuit 8.

Capacitor 13 is charged through resistor 12 from battery 3. While motor 4 is being operated by control circuit 20 in the normal operating mode, each of the series of electrical output signals of monostable multivibrator circuit 8 supplies sufficient base-emitter drive current to transistor 16 to produce collector-emitter saturation. Consequently, capacitor 13 charges through resistor 12 for the period of time between each of the series of output signals of monostable multivibrator circuit 8 and discharges through the series combination of resistor 17, the collector-emitter electrodes of transistor 16 and resistor 18 during the period of each of the output signals of monostable multivibrator circuit 8. Resistors 12, 17 and 18 are so proportioned that the capacitor 13 charge circuit RC time constant is greater than the period between successive output electrical signal pulses of monostable multivibrator circuit 8 and the capacitor 13 discharge circuit RC time constant is less than the period of each of the output signals of monostable multivibrator circuit 8. Therefore, capacitor 13 will not become charged to a direct current potential level of a sufficient magnitude to be equal to the inverse breakdown potential of Zener diode 14 while motor 4 is operating normally. With these conditions, transistor 11 is maintained in the cutoff or not conductive mode and the circuit operates normally. Should nortor 4 become stalled and while in the stall mode, tachometer generator 6 does not produce output signals and, consequently, monostable multivibrator circuit 8 does not produce the series of electrical output signals applied to the base electrode of transistor 16 to periodically trigger transistor 16 conductive through the collector-emitter electrodes. Consequently, capacitor 13 does not become discharged and continues to charge through resistor 12. When the charge upon capacitor 13 has increased to a direct current potential level of a magnitude equal to the inverse breakdown potential of Zener diode 14, this device breaks down and conducts in the reverse direction. As the charge upon capacitor 13 increases with conditions of motor stall, the combination of resistor 12, capacitor 13, resistors 17 and 18 and transistor 16 provide circuitry which employs the series of electrical signals produced by tachometer generator 6 to produce a direct current reference potential signal which increases rapidly in magnitude when the motor becomes stalled. While Zener diode 14 is conducting in the reverse direction, base-emitter drive current is supplied therethrough to NPN transistor 11 in the proper polarity relationship to trigger this device conductive through the collector-emitter electrodes thereof. The collector-emitter electrodes of transistor 11 are connected in circuit with speed control circuit 20 in such a manner that while transistor 11 is conductive through the collector-emitter electrodes, output switching transistor 35 of the motor speed control circuit 20 is extinguished. That is, the collector-emitter electrodes of transistor 11 are connected in circuit with speed control circuit 20 for extinguishing output switching transistor 35 thereof while transistor 11 is conducting through the collector-emitter electrodes. With the motor speed control circuit 20 of FIG. 1, the collector-emitter electrodes of transistor 11 are connected across the control or base electrode of output switching transistor 35 of motor speed control circuit 20 and point of reference or ground potential 5. Consequently, while transistor 11 is conducting through the collector-emitter electrodes thereof with conditions of motor stall, baseemitter drive current is diverted from output switching transistor 35 to extinguish this device and to maintain it not conductive to remove power from the motor 4 and the system is maintained disenabled.

The combination of capacitor 13 and resistor 12 is selected to provide a delay period so that control circuit 20 is disenabled only under conditions of motor stall and resistor 12 is kept small enough in ohmic value to supply sufficient base-emitter drive current to transistor 11. The "beta" of transistor 11 and the value of resistor 12 must allow transistor 11 to sink all of the base drive current supplied to output switching transistor 35 by motor speed control circuit 20. Resistor 17 limits the peak collector-emitter current flow through transistor 16 and must be small compared to resistor 12 to maintain the charge upon capacitor 13 less than the inverse breakdown potential of Zener diode 14 with normal motor operating conditions. Resistor 18 may be provided to increase the input impedance to the base electrode of transistor 16 and may or may not be required depending upon the input impedance requirements of transistor 16. Zener diode 14 is selected to have an inverse breakdown potential near the minimum supply potential of battery 3 thereby permitting the use of smaller values for resistor 12 and capacitor 13 for a selected time delay. In this regard, Zener diode 14 may be replaced by a series diode stack, if desired.

With the motor speed control circuit 40 of FIG. 2, the output switching transistor 45 is of the PNP type which is driven by NPN transistor 31. As with the circuit of FIG. 1, the magnitude of the direct current potential level signal across junction 24 and point of reference or ground potential 5 increases and decreases as the speed of motor 4 increases and decreases, respectively. An increase of the direct current potential level of this signal with an increase of speed of motor 4 produces an increase of the degree of conduction through transistor 23. An increase of the degree of conduction through transistor 23 results in a decrease of potential across movable contact 30 of potentiometer 29 and point of reference or ground potential 5, consequently, the degree of conduction through transistor 31 decreases. A decrease of the degree of conduction through transistor 31 decreases the amount of emitter-base drive current supplied to output switching transistor 45. The decrease of emitter-base drive current supplied to output switching transistor 45 reduces the degree of emitter-collector conduction therethrough, a condition which tends to reduce the speed of motor 4. A decrease of the direct current potential level of this signal with a decrease of the speed of motor 4 produces a decrease of the degree of conduction through transistor 23. A decrease of the degree of conduction through transistor 23 results in an increase of potential across movable contact 30 of potentiometer 29 and point of reference or ground potential 5, consequently, the degree of conduction through transistor 31 increases. An increase of the degree of conduction through transistor 31 increases the amount of emitter-base drive current supplied to output switching transistor 45. The increase of emitter-base drive current to output switching transistor 45 increases the degree of emitter-collector conduction therethrough, a condition which tends to increase the speed of motor 4. As with the motor speed control circuit 20 of FIG. 1, the collector-emitter electrodes of transistor 11 are connected in circuit with speed control circuit 40 in such a manner that while transistor 11 is conductive through the collector-emitter electrodes, output switching transistor 45 of the motor speed control circuit 40 is extinguished. That is, the collector-emitter electrodes of transistor 11 are connected in circuit with speed control circuit 40 for extinguishing output switching transistor 45 thereof while transistor 11 is conducting through the collector-emitter electrodes. With the motor speed control circuit 40 of FIG. 2, the collector-emitter electrodes of transistor 11 are connected across the control of base electrode of driver transistor 31 and point of reference or ground potential 5. Consequently, while transistor 11 is conducting through the collector-emitter electrodes thereof with conditions of motor stall, base-emitter drive current is diverted from driver transistor 31 to extinguish this device and to maintain it not conductive. While driver transistor 31 is not conductive through the collector-emitter electrodes, emitter-base drive current is not supplied to output switching transistor 45, consequently, this device extinguishes to remove power from the motor 4 and the system is maintained disenabled.

In the circuits set forth schematically in FIGS. 1 and 2 of the drawing, the output signals of monostable multivibrator circuit 8 are shown to be applied across the base-emitter electrodes of transistor 16 of motor stall protection circuit 20. It is to be specifically understood that it is not necessary to the invention that the signals applied across the base-emitter electrodes of transistor 16 be the output signals of monostable multivibrator circuit 8. The output signals of wave shaper circuit 7 or, through a proper buffer circuit, the output signals of tachometer generator 6 may be applied across the base-emitter electrodes of transistor 16 without departing from the spirit of the invention. It is only necessary that the signals applied across the base-emitter electrodes of the transistor selected to correspond to transistor 16 be of the proper polarity to produce base drive current therethrough, be repetitive in nature and be provided only with normal motor operating conditions.

The motor stall protection circuit of this invention has been described in this specification in combination with a motor speed control circuit of the direct current amplifier type which controls the degree of conduction through the output switching transistor. It is to be specifically understood that the stall protection circuit of this invention is equally suitable for use in combination with direct current motor speed control circuits of the type which provide discrete "on and off" switching of the output switching transistor.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A motor stall protection circuit comprising in combination with a supply potential source, an electric motor and a speed control circuit therefor of the type which completes an energizing circuit for the motor across the supply potential source through the current carrying electrodes of a switching transistor: an NPN transistor having base, collector and emitter electrodes, said collector-emitter electrodes being connected in circuit with said speed control circuit for extinguishing said switching transistor while said NPN transistor is conductive through said collector-emitter electrodes; means for producing a direct current reference potential signal which increases rapidly in magnitude when the controlled motor has become stalled; a Zener diode; and means for applying said direct current reference potential signal across the series combination of said Zener diode and said base-emitter electrodes of said NPN transistor for supplying base drive current to said NPN transistor while the level of said direct current potential is of a magnitude equal to the inverse breakdown potential level of said Zener diode.

2. A motor stall protection circuit comprising in combination with a supply potential source, an electric motor and a speed control circuit therefor of the type which completes an energizing circuit for the motor across the supply potential source through the current carrying electrodes of a switching transistor while base drive current is supplied thereto; means for producing a series of electrical signals of a frequency directly proportional to motor speed; an NPN transistor having base, collector and emitter electrodes, said collector-emitter electrodes being connected in circuit with said speed control circuit in such a manner that while said NPN transistor is conductive through said collector-emitter electrodes, base drive current is removed from said switching transistor; means responsive to said series of electrical signals for producing a direct current reference potential signal which increases rapidly in magnitude when the controlled motor has become stalled; a Zener diode; and means for applying said direct current reference potential signal across the series combination of said Zener diode and said base-emitter electrodes of said NPN transistor while the level of said direct current potential is of a magnitude equal to the inverse breakdown potential level of said Zener diode.

3. A motor stall protection circuit comprising in combination with a supply potential source, an electric motor and a speed control circuit therefor of the type which completes an energizing circuit for the motor across the supply potential source through the current carrying electrodes of a switching transistor while base drive current is supplied thereto: means for producing a series of electrical signals of a frequency directly proportional to motor speed; a first transistor having a control electrode and two current carrying electrodes for disenabling said speed control circuit when conductive through said current carrying electrodes during motor stall conditions, said current carrying electrodes being connected in circuit with said speed control circuit in such a manner that while said first transistor is conductive, base drive current is removed from said switching transistor; a resistor; a capacitor; means for connecting said resistor and capacitor in series across said supply potential source whereby said capacitor is charged through said resistor; a Zener diode; means for connecting said Zener diode in a reverse polarity relationship across said control electrode of said first transistor and the junction between said resistor and capacitor whereby base drive current is supplied to said first transistor when the charge upon said capacitor reaches a potential level equal to the inverse breakdown potential level of said Zener diode; a second transistor having a control electrode and two current carrying electrodes; means for applying said series of electrical signals to said control electrode of said second transistor in the proper polarity relationship to produce base drive current therethrough; and means for connecting said current carrying electrodes of said second transistor across said capacitor for periodically providing a discharge circuit for said capacitor at a frequency proportional to motor speed.

4. A motor stall protection circuit comprising in combination with a supply potential source having supply and return terminals, an electric motor and a speed control circuit therefor of the type which completes an energizing circuit for the motor across the supply potential source through the current carrying electrodes of an NPN switching transistor while drive current is supplied to the base electrode thereof; means for producing a series of electrical signals of a frequency directly proportional to motor speed; a first transistor having a control electrode and two current carrying electrodes for disenabling said speed control circuit when conductive through said current carrying electrodes during motor stall conditions, said current carrying electrodes being connected across said base electrode of said switching transistor and said return terminal of said supply potential source; a resistor; a capacitor; means for connecting said resistor and capacitor in series across said supply potential source whereby said capacitor is charged through said resistor; a Zener diode; means for connecting said Zener diode in a reverse polarity relationship across said control electrode of said first transistor and the junction between said resistor and capacitor whereby base drive current is supplied to said first transistor when the charge upon said capacitor reaches a potential level equal to the inverse breakdown potential level of said Zener diode; a second transistor having a control electrode and two current carrying electrodes; means for applying said series of electrical signals to said control electrode of said second transistor in the proper polarity relationship to produce base drive current therethrough; and means for connecting said current carrying electrodes of said second transistor across said capacitor for periodically providing aa discharge circuit for said capacitor at a frequency proportional to motor speed.

5. A motor stall protection circuit comprising in combination with a supply potential source having supply and return terminals, an electric motor and a speed control circuit therefor of the type which completes an energizing circuit for the motor across the supply potential source through the current carrying electrodes of a PNP switching transistor while base drive current is supplied thereto through the current carrying electrodes of an NPN driver transistor while drive current is supplied to the base electrode thereof; means for producing a series of electrical signals of a frequency directly proportional to motor speed; a first transistor having a control electrode and two current carrying electrodes for disenabling said speed control circuit when conductive through said current carrying electrodes during motor stall conditions, said current carrying electrodes being connected across said base electrode of said driver transistor and said return terminal of said supply potential source; a resistor; a capacitor; means for connecting said resistor and capacitor in series across said supply potential source whereby said capacitor is charged through said resistor; a Zener diode; means for connecting said Zener diode in a reverse polarity relationship across said control electrode of said first transistor and the junction between said resistor and capacitor whereby base drive current is supplied to said first transistor when the charge upon said capacitor reaches a potential level equal to the inverse breakdown potential level of said Zener diode; a second transistor having a control electrode and two current carrying electrodes; means for applying said series of electrical signals to said control electrode of said second transistor in the proper polarity relationship to produce base drive current therethrough; and means for connecting said current carrying electrodes of said second transistor across said capacitor for periodically providing a discharge circuit for said capacitor at a frequency proportional to motor speed.

6. A motor stall protection circuit comprising in combination with a supply potential source, an electric motor and a speed control circuit therefor of the type which completes an energizing circuit for the motor across the supply potential source through the current carrying electrodes of a switching transistor: a control transistor having base, collector and emitter electrodes, said collector-emitter electrodes being connected in circuit with said speed control circuit for extinguishing said switching transistor while said control transistor is conductive through said collector-emitter electrodes; means for producing a direct current reference potential signal which increases rapidly in magnitude when the controlled motor has become stalled; a Zener diode; and means for applying said direct current reference potential signal across the series combination of said Zener diode and said base and emitter electrodes of said control transistor for supplying base drive current to said control transistor while the level of said direct current potential is of a magnitude equal to the inverse breakdown potential level of said Zener diode.

7. A motor stall protection circuit comprising in combination with a supply potential source, an electric motor and a speed control circuit therefor of the type which completes an energizing circuit for the motor across the supply potential source through the current carrying electrodes of a switching transistor while base drive current is supplied thereto; means for producing a series of electrical signals of a frequency directly proportional to motor speed; a control transistor having base, collector and emitter electrodes, said collector-emitter electrodes being connected in circuit with said speed control circuit in such a manner that while said control transistor is conductive through said collector-emitter electrodes, base drive current is removed from said switching transistor; means responsive to said series of electrical signals for producing a direct current reference potential signal which increases rapidly in magnitude when the controlled motor has become stalled; a Zener diode; and means for applying said direct current reference potential signal across the series combination of said Zener diode and said base and emitter electrodes of said control transistor for supplying base drive current to said control transistor while the level of said direct current potential is of a magnitude equal to the inverse breakdown potential level of said Zener diode.

* * * * *

UNITED STATES PATENT AND TRADEMARK OFFICE
CERTIFICATE OF CORRECTION

PATENT NO. : 3,931,557
DATED : January 6, 1976
INVENTOR(S) : David W. Osburn

It is certified that error appears in the above—identified patent and that said Letters Patent are hereby corrected as shown below:

```
Col. 5, line  5, "nortor" should read -- motor --;
        line 46, "baseemitter" should read -- base-emitter --.
Col. 8, line 11, after "transistor" insert -- for supplying
                 base drive current to said NPN transistor --.
Col. 9, line 17, "aa" should read -- a --.
```

Signed and Sealed this thirtieth Day of March 1976

[SEAL]

Attest:

RUTH C. MASON
*Attesting Officer*

C. MARSHALL DANN
*Commissioner of Patents and Trademarks*